(12) United States Patent
Okami et al.

(10) Patent No.: US 8,067,102 B2
(45) Date of Patent: *Nov. 29, 2011

(54) ABSORPTION TYPE MULTI-LAYER FILM ND FILTER

(75) Inventors: Hideharu Okami, Chiba (JP); Yoshiyuki Abe, Chiba (JP); Tokuyuki Nakayama, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 12/585,722

(22) Filed: Sep. 23, 2009

(65) Prior Publication Data

US 2010/0014178 A1    Jan. 21, 2010

Related U.S. Application Data (62) Division of application No. 11/229,305, filed on Sep. 19, 2005, now Pat. No. 7,666,527.

(30) Foreign Application Priority Data

Nov. 24, 2004  (JP) ................................. 2004-338587
Jun. 21, 2005  (JP) ................................. 2005-180936

(51) Int. Cl.
  *B32B 15/04*   (2006.01)
  *B32B 17/06*   (2006.01)
(52) U.S. Cl. ........ 428/701; 428/426; 428/428; 428/432; 428/702
(58) Field of Classification Search .................. 359/580, 359/589, 885, 888; 428/426, 701, 702, 428, 428/432
  See application file for complete search history.

(56) References Cited

U.S. PATENT DOCUMENTS

| 3,826,728 | A | * | 7/1974 | Chambers et al. | ........ 204/192.27 |
| 4,960,310 | A | * | 10/1990 | Cushing | ........................ 359/888 |
| 5,715,103 | A | * | 2/1998 | Amano et al. | ................ 359/888 |
| 6,671,109 | B2 | | 12/2003 | Kunii | ............................. 359/888 |

(Continued)

FOREIGN PATENT DOCUMENTS

JP    55-47361    11/1980

(Continued)

OTHER PUBLICATIONS

"Optics Leading the Light," Wavelength Technology Singapore Pte. Ltd., http://www.wavelength-tech.com/Material-MgF2.htm.

*Primary Examiner* — Jennifer McNeil
*Assistant Examiner* — Lauren Robinson
(74) *Attorney, Agent, or Firm* — Kratz, Quintos & Hanson, LLP (57) ABSTRACT

In an absorption type multi-layer film ND filter having a thin substrate and provided thereon first and second absorption type multi-layer films which attenuate transmitted light, the first and second absorption type multi-layer films are constituted of multi-layer films each consisting essentially of dielectric layers formed of $SiO_2$, $Al_2O_3$ or a mixture of these and metal film layers formed of Ni alone or an Ni alloy; the layers being alternately layered on the substrate; and the first and second absorption type multi-layer films are so formed on one side and the other side, respectively, of the substrate as to have a film structure in which they are symmetrical to each other interposing the substrate between them, and the warpage of the substrate has been controlled at a curvature of radius of 500 mm or more.

7 Claims, 9 Drawing Sheets

U.S. PATENT DOCUMENTS

| | | | |
|---|---|---|---|
| 6,842,301 B2 * | 1/2005 | Nakajima et al. | 359/888 |
| 7,239,464 B2 | 7/2007 | Okami et al. | 359/888 |
| 2003/0026014 A1 * | 2/2003 | Kunii | 359/888 |
| 2003/0190131 A1 | 10/2003 | Barth | 385/129 |
| 2004/0027706 A1 | 2/2004 | Nakajima et al. | 359/891 |
| 2006/0061867 A1 * | 3/2006 | Kunii | 359/601 |

FOREIGN PATENT DOCUMENTS

| | | |
|---|---|---|
| JP | 57-195207 | 11/1982 |
| JP | 10-133253 | 5/1998 |
| JP | 2000-96167 | 4/2000 |
| JP | 3359114 | 10/2002 |
| JP | 2002-350610 | 12/2002 |

* cited by examiner

ABSORPTION TYPE MULTI-LAYER FILM ND FILTER

CROSS-REFERENCE TO RELATED APPLICATIONS

This application is a Divisional Application of prior application Ser. No. 11/229,305 filed on Sep. 19, 2005 now U.S. Pat. No. 7,666,527. This application is based upon and claims the benefit of priority from the prior Japanese Patent Application No. 2004-338587, filed on Nov. 24, 2004 and Japanese Patent Application No. 2005-180936, filed on Jun. 21, 2005, the entire contents of which are incorporated herein by reference.

BACKGROUND OF THE INVENTION

1. Field of the Invention

This invention relates to an absorption type multi-layer film ND filter which attenuates transmitted light in the visible spectral range. More particularly, it relates to an improvement of an absorption type multi-layer film ND filter making use of a thin substrate such as a resin film, a resin sheet or a thin glass sheet.

2. Description of the Related Art

As ND filters (neutral density filters) of this type, a reflection type ND filter which reflects incident light to attenuate it and an absorption type ND filter which absorbs incident light to attenuate it are known in the art. Then, where an ND filter is set in a lens optical system in which the reflected light comes into question, the absorption type ND filter is commonly used. This absorption type ND filter includes a type in which the substrate itself is incorporated with an absorptive substance (a color glass ND filter) or coated with it, and a type in which the substrate itself does not absorb light and a thin film formed on its surface does. Also, in the case of the latter, in order to prevent reflection at the thin-film surface, the thin film is constituted of a multiple layer so that it can have the function to attenuate transmitted light and also have the effect of preventing reflection.

As an absorption type multi-layer film ND filter in which such a thin film is constituted of a multiple layer, a multi-layer film formed of combination of a dielectric layer and a titanium oxide layer and a multi-layer film formed of combination of a dielectric film layer and a niobium film layer are disclosed in Japanese Patent No. 3359114 and Japanese Patent Application Laid-open No. 2002-350610, respectively.

In Japanese Patent Application Laid-open No. H10-133253, further disclosed is a technique in which a hard film layer of a dielectric is formed on at least one outermost surface so as not to be scratched because of some mechanical contact.

Now, in an absorption type multi-layer film ND filter used in compact thin-type digital cameras, its substrate itself must be thin because the camera has a narrow set-in space, and a very thin glass sheet or resin sheet or a resin film is used as the substrate.

However, where such a very thin glass sheet or resin sheet or a resin film is used as the substrate, a problem peculiar thereto as shown below may come about.

That is, the problem is that, if a multi-layer film having a different structure is formed for each side of the very thin glass sheet or resin sheet or the resin film the substrate may warp toward one side because of the film stress of each multi-layer film formed thereon. In such a case, the substrate does not warp even when the multi-layer film is formed on each side, as long as films are formed under ideal conditions that the overall film stress is cancelled for each one-side multi-layer film, i.e., under conditions such that the substrate does not warp even when the film is formed on the former's one side only. Then, as methods by which the overall film stress is cancelled, available are a method in which the film stress is made not to exist for each layer and a method in which a film with tensile stress and a film with compressive stress are alternately formed to cancel the film stress. It, however is difficult in fact to make zero the film stress of a multi-layer film.

Figure 1:
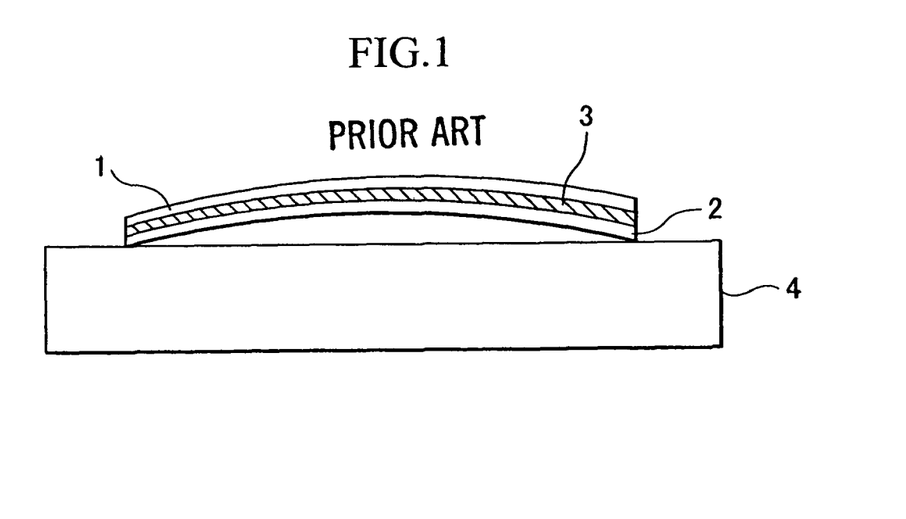
FIG. 1 cross-sectionally illustrates the structure of an absorption type multi-layer film ND filter according to the background art.

For example, in the case of a commonly available absorption type multi-layer film ND filter in which, as shown in FIG. 1, an absorption type multi-layer film 1 is formed on one side of a substrate 3 and a reflection preventive film 2 is formed on the other side, the substrate may warp if the absorption type multi-layer film 1 and the reflection preventive film 2 are poorly balanced in film stress and where the substrate is constituted of a very thin glass sheet or resin sheet or a resin film. Then, in the case of the absorption type multi-layer film 1 shown in FIG. 1, in which metallic films are so thin as to be almost constituted of $SiO_2$, the above method in which a film with tensile stress and a film with compressive stress are alternately formed to cancel the film stress can not be employed because the metallic films are thin, and the film stress of the $SiO_2$ film must be controlled to be zero. However, it is difficult in fact to set film forming conditions under which the film stress of the $SiO_2$ film can be made zero.

There is also a problem that, if the substrate has warped, it is difficult to handle such an ND filter when it is bonded or welded, and also a difficulty that images may come distorted when it is used in the vicinity of an imaging element is also a matter of concern.

SUMMARY OF THE INVENTION

The present invention has been made taking note of such problems. Accordingly, an object of the present invention is to provide an absorption type multi-layer film ND filter whose substrate can not easily warp even when a thin substrate such as a resin film, a resin sheet or a thin glass sheet is used, and which also can promise superior mass productivity and moreover can achieve transmittance attenuation that is flat for wavelengths.

Another object of the present invention is to also provide an absorption type multi-layer film ND filter which enables stable production of filters with uniform characteristics when manufactured by magnetron sputtering.

That is, the present invention is an absorption type multi-layer film ND filter according to the present invention comprises:

a substrate formed of a resin film, a resin sheet or a thin glass sheet, and provided thereon first and second absorption type multi-layer films which attenuate transmitted light, wherein;

the first and second absorption type multi-layer films are constituted of multi-layer films each consisting essentially of dielectric layers formed of $SiO_2$, $Al_2O_3$ or a mixture of these and metal film layers formed of Ni alone or an Ni alloy; the layers being alternately layered on the substrate; and the first and second absorption type multi-layer films are so formed on one side and the other side, respectively, of the substrate as to have a film structure in which the multi-layer films are symmetrical to each other interposing the substrate between them, and the warpage of the substrate has been controlled at a curvature of radius of 500 mm or more.

As the Ni alloy, it may be constituted of an Ni alloy material formed by adding to Ni at least one element selected from Ti, Al, V, W, Ta and Si.

According to the absorption type multi-layer film ND filter of the present invention, on both sides of the substrate formed of a resin film, a resin sheet or a thin glass sheet, the first and second absorption type multi-layer films having a film structure in which they are symmetrical to each other interposing the substrate between them are respectively formed so that the film stresses on the both sides can be cancelled to each other. Hence, even where a thin substrate is used, an absorption type multi-layer film ND filter having a superior flatness can be materialized the warpage of the substrate of which has been controlled at a curvature of radius of 500 mm or more.

In addition, the Ni alone or Ni alloy that has a small wavelength dependence of transmittance in the visible spectral region is used as the metal film layers in the absorption type multi-layer films. Hence, even an absorption type multi-layer film ND filter can also be materialized which can achieve transmittance attenuation that is flat for wavelengths.

Moreover, the first and second absorption type multi-layer films are formed on one side and the other side, respectively, of the substrate to have the film structure in which they are symmetrical to each other interposing the substrate between them. Hence, the productivity in producing absorption type multi-layer film ND filters can be superior, and also there is no difference between the both sides to make management easy.

In particular, in the case when the above metal film layers are constituted of the Ni alloy material formed by adding to Ni at least one element selected from Ti, Al, V, W, Ta and Si, the ferromagnetic properties of an Ni target is weakened. Hence, absorption type multi-layer film ND filters with uniform characteristics can stably be produced by magnetron sputtering.

DESCRIPTION OF THE PREFERRED EMBODIMENTS

The absorption type multi-layer film ND filter according to the present invention is described below in detail with reference to the accompanying drawings.

Incidentally, where a thin substrate having no absorption in the service wavelength range is used, and in order that absorption type multi-layer films having the same film structure and having reflection preventive function are formed on the both sides, respectively, of a substrate so that they can have the desired transmittance, the absorption of each absorption type multi-layer film must be taken into account to make set-up.

More specifically, in order to produce an ND filter having a transmittance of 25%, absorption type multi-layer films each having a transmittance of 50% (=√25%) must be formed on the both sides, respectively. Also, in order to produce an ND filter having a transmittance of 12.5%, absorption type multi-layer films each having a transmittance of 35% (=√12.5%) must be formed on the both sides, respectively.

Figure 2:
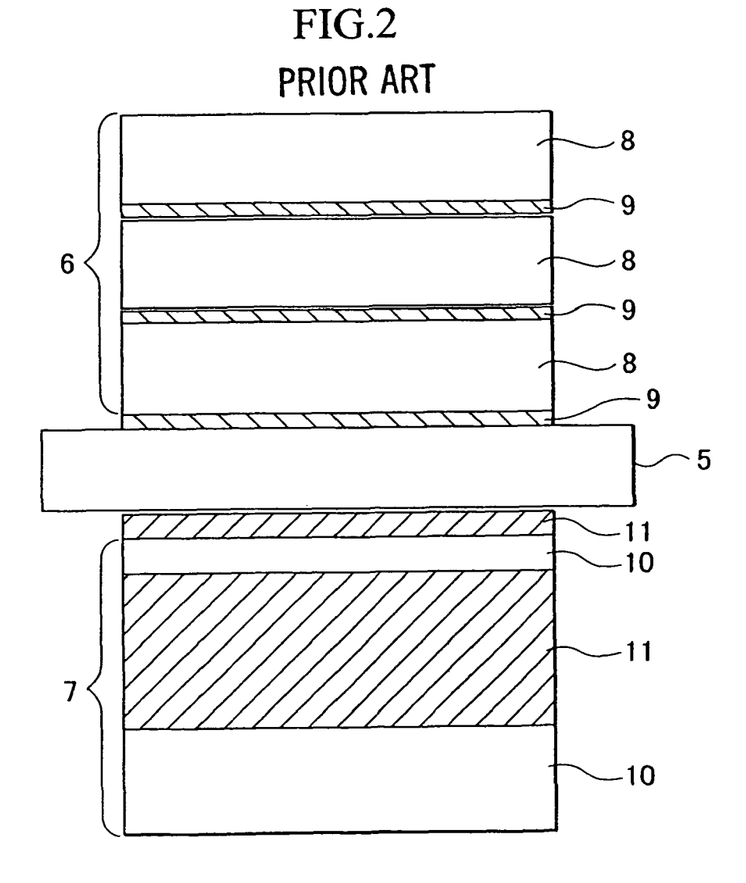
FIG. 2 cross-sectionally illustrates the structure of another absorption type multi-layer film ND filter according to the background art (Comparative Example).
Figure 3:
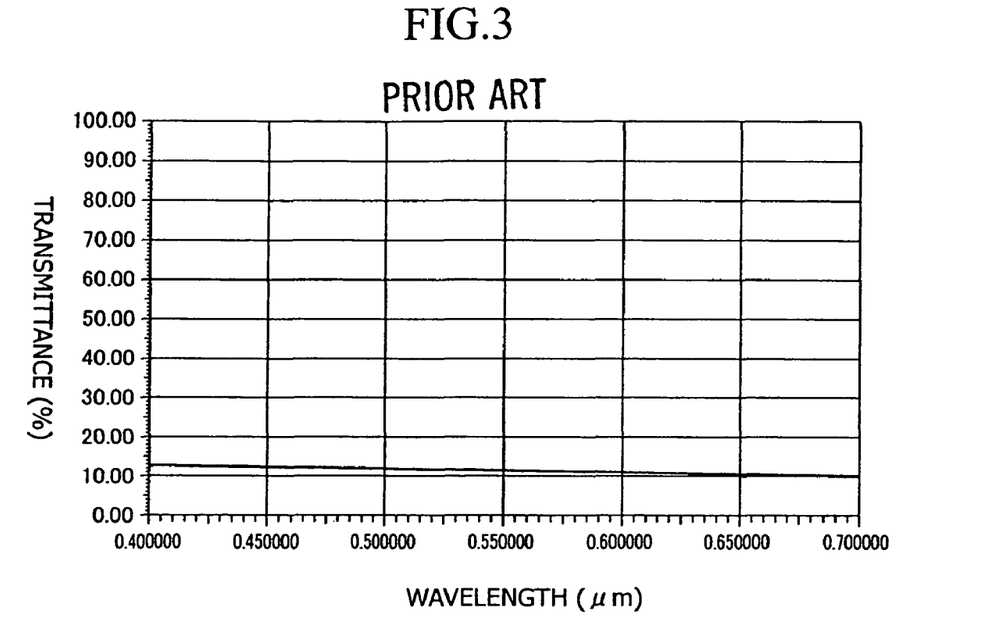
FIG. 3 is a graph showing theoretical spectral transmission characteristics in an absorption type multi-layer film of an absorption type multi-layer film ND filter according to the background art.
Figure 4:
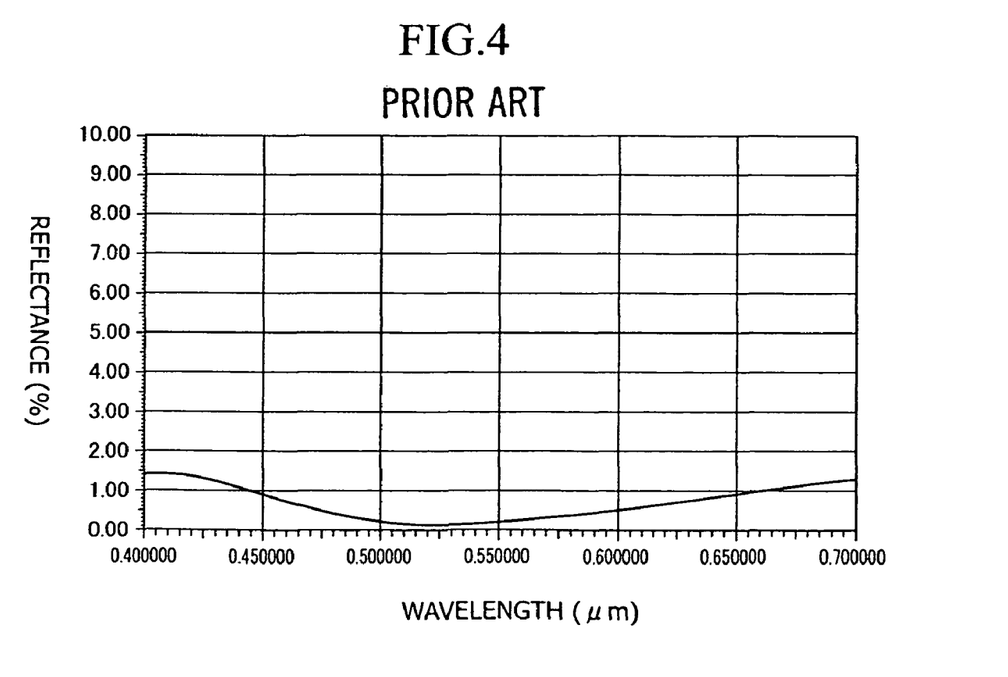
FIG. 4 is a graph showing theoretical spectral reflection characteristics in an absorption type multi-layer film of an absorption type multi-layer film ND filter according to the background art.
Figure 5:
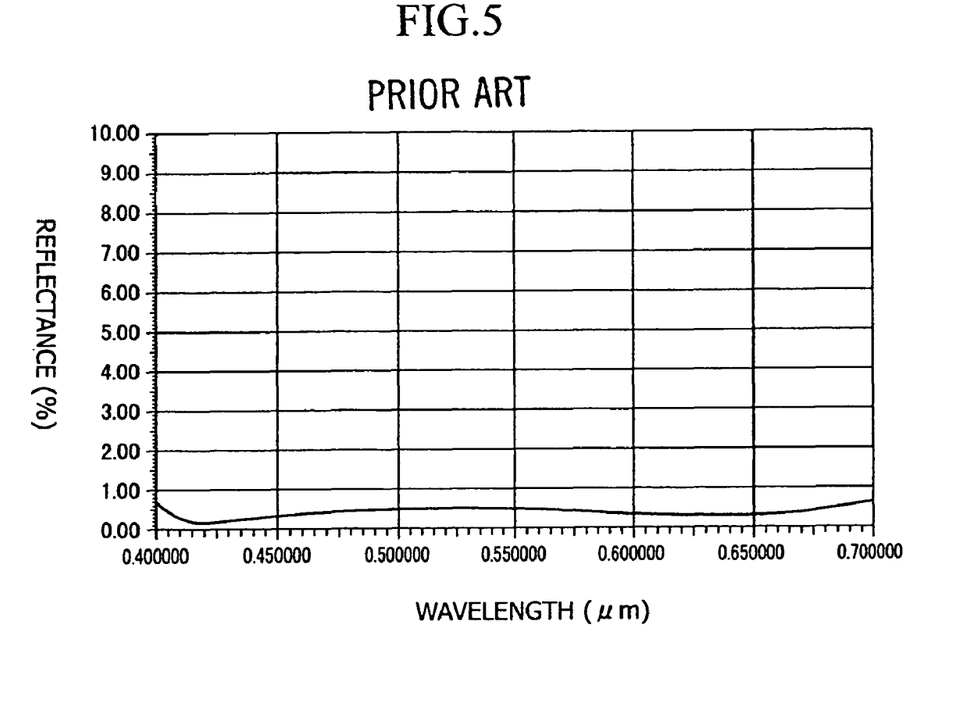
FIG. 5 is a graph showing theoretical spectral reflection characteristics in a multi-layer reflection preventive film of an absorption type multi-layer film ND filter according to the background art.

An absorption type multi-layer film ND filter according to the background art, having a transmittance of 12.5% is shown in FIG. 2 first. More specifically, this absorption type multi-layer film ND filter according to the background art is chiefly constituted of a film (PC: polycarbonate) substrate 5, and, formed on the surface of this substrate 5, an absorption type multi-layer film (stated specifically "a metal film layer 9 formed of Ni alone/a dielectric layer 8 formed of $SiO_2$/the same metal film layer 9 as the first one/the same dielectric layer 8 as the first one/the same metal film layer 9 as the first one/the same dielectric layer 8 as the first one") 6 having reflection preventive function and on the back of the substrate 5 a multi-layer reflection preventive film (stated specifically "a metal film layer 11 formed of $Ta_2O_5$/a dielectric layer 10 formed of $SiO_2$/the same metal film layer 11 as the first one/the same dielectric layer 10 as the first one") 7. Incidentally, specific film structure of the absorption type multi-layer film and multi-layer reflection preventive film, constituent materials therefor, and layer thickness and refractive index of each layer are respectively shown in Table 1 below. Also, theoretical spectral transmission characteristics in the absorption type multi-layer film 6 of the absorption type multi-layer film ND filter according to the background art, theoretical spectral reflection characteristics in the absorption type multi-layer film 6 of the same and theoretical spectral reflection characteristics in the multi-layer reflection preventive film 7 of the same are shown in FIG. 3, FIG. 4 and FIG. 5, respectively.

TABLE 1

| | Materials | Refractive index | Physical layer thickness (nm) |
|---|---|---|---|
| Medium: | Air | 1.00 | — |
| | Absorption type multi-layer film: (total layer thickness: 270 nm) | | |
| | $SiO_2$ | 1.46 | 80 |
| | Ni | 2.28 | 10 |
| | $SiO_2$ | 1.46 | 80 |
| | Ni | 2.28 | 10 |
| | $SiO_2$ | 1.46 | 80 |
| | Ni | 2.28 | 10 |
| Substrate: | PC | 1.58 | — |
| | Multi-layer reflection preventive film: (total layer thickness: 256 nm) | | |
| | $Ta_2O_5$ | 2.10 | 14 |
| | $SiO_2$ | 1.46 | 29 |
| | $Ta_2O_5$ | 2.10 | 127 |
| | $SiO_2$ | 1.46 | 86 |
| Medium: | Air | 1.00 | — |

On the other hand, the absorption type multi-layer film ND filter according to the present invention is an absorption type multi-layer film ND filter comprising a substrate formed of a resin film, a resin sheet or a thin glass sheet, and provided thereon first and second absorption type multi-layer films which attenuate transmitted light, and the absorption type multi-layer films are constituted of multi-layer films each consisting essentially of dielectric layers formed of $SiO_2$, $Al_2O_3$ or a mixture of these and metal film layers formed of Ni alone or an Ni alloy; the layers being alternately layered on the substrate; and the first and second absorption type multi-layer films are so formed on one side and the other side, respectively, of the substrate as to have a film structure in which the multi-layer films are symmetrical to each other interposing the substrate between them, and the warpage of the substrate has been controlled at a curvature of radius of 500 mm or more.

As the substrate, it is constituted of a resin film, a resin sheet or a thin glass sheet, and there are no particular limitations on materials therefor. Preferred are those which are transparent. Where mass productivity is taken into account, the substrate may preferably be a substrate having flexibility, which enables dry-process roll-to-roll process coating described later. The substrate having flexibility is superior to conventional glass substrates and the like also in view of advantages that it is inexpensive, light-weight and rich in deformation properties. In particular, a resin sheet or a resin film is preferred as the substrate.

As specific examples of the resin sheet or resin film constituting the substrate, it may include resin sheet or resin film single materials selected from resin materials of polyethylene terephthalate (PET), polyether sulfone (PES), polyarylate (PAR), polycarbonate (PC), polyolefin (PO) and norbornene, and composite materials of i) the resin sheet or resin film single materials selected from the above resin materials and ii) acrylic organic films with which one side or both sides of any of these single materials is/are covered. In particular, as to the norbornene resin material, it may include, as typical materials, ZEONOR (trade name), available from Nippon Zeon Co., Ltd., and ARTON (trade name), available from JSR Corporation.

The metal film layers are each constituted of Ni alone or an Ni alloy. In particular, it may preferably be constituted of an Ni alloy material formed by adding to Ni at least one element selected from Ti, Al, V, W, Ta and Si.

The reason therefor will be stated in detail later, and here may be sketched out as follows: Where Ni layers are formed by sputtering, the thickness of an Ni target decreases with continuous use of the Ni target, where the leakage magnetic field in plasma space becomes stronger at the part where the Ni target has become thinner. Then, as the leakage magnetic field in plasma space becomes stronger, discharge characteristics (such as discharge voltage and discharge current) become different, so that the rate of film formation may change. That is, the reason is that the continuous use of the same Ni target for a long time brings about the problem that the rate of film formation for the Ni film changes as the Ni target is consumed, to make it difficult to stably produce absorption type multi-layer film ND filters with uniform characteristics. To avoid this problem, the above Ni alloy material formed by adding to Ni at least one element selected from Ti, Al, V, W, Ta and Si may be used to constitute the metal film layer.

Figure 6:
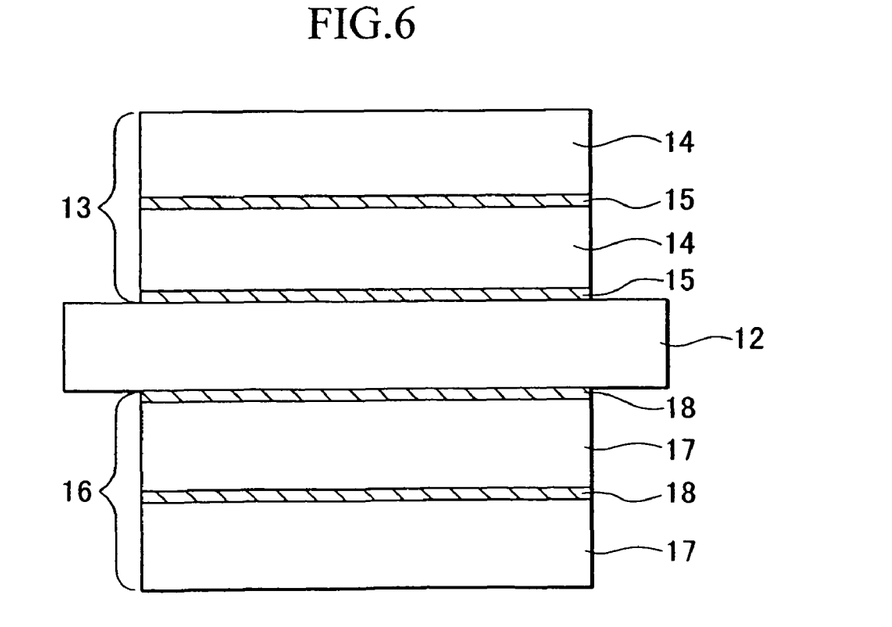
FIG. 6 cross-sectionally illustrates the structure of the absorption type multi-layer film ND filter according to the present invention (Example).
Figure 7:
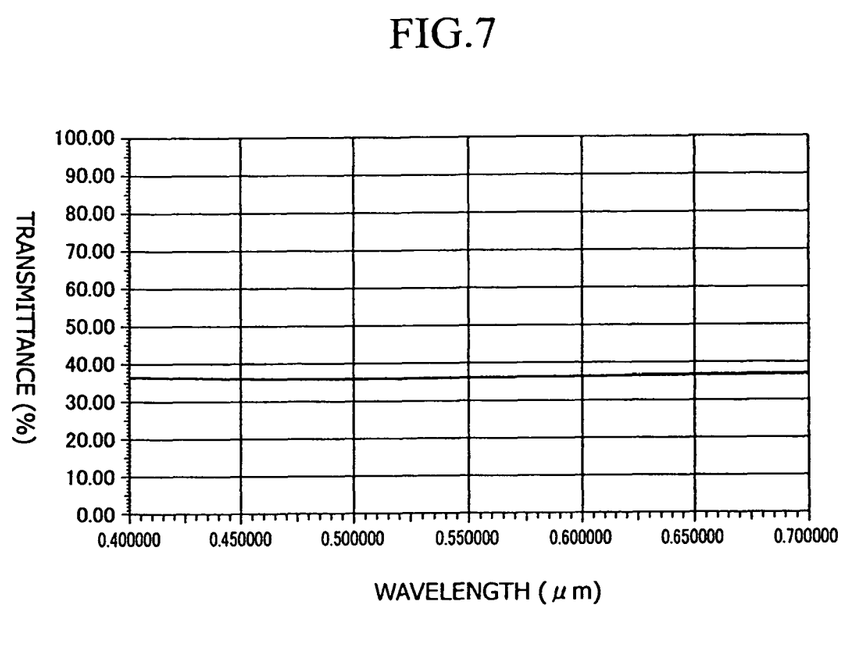
FIG. 7 is a graph showing theoretical spectral transmission characteristics in an absorption type multi-layer film of an absorption type multi-layer film ND filter according to the present invention, shown in Table 2.
Figure 8:
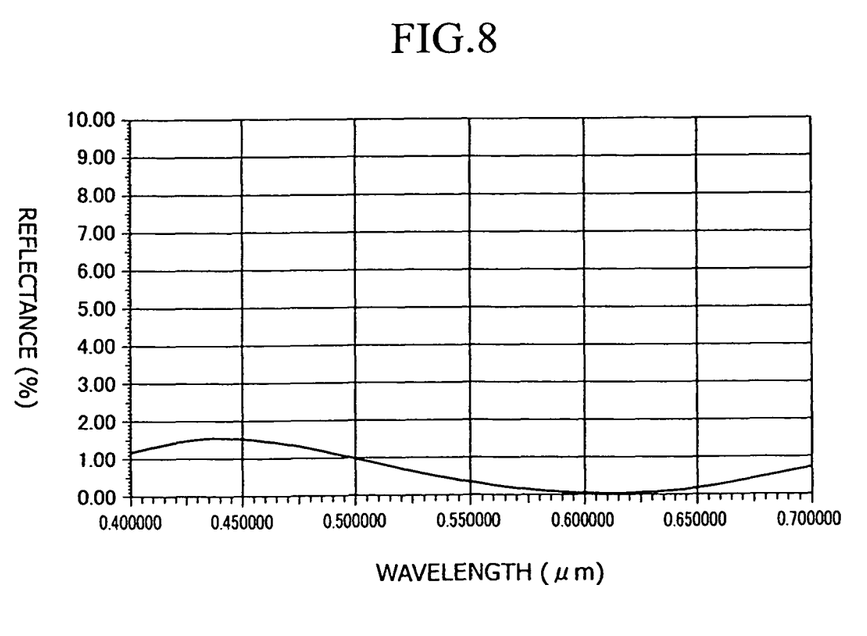
FIG. 8 is a graph showing theoretical spectral reflection characteristics in the absorption type multi-layer film of the absorption type multi-layer film ND filter according to the present invention, shown in Table 2.

Next, a specific example of the absorption type multi-layer film ND filter according to the present invention, having a transmittance of 12.5%, is shown in FIG. 6, which ND filter is chiefly constituted of a film (PC: polycarbonate) substrate 12, and absorption type multi-layer films 13 and 16 having reflection preventive function which are formed on the top side and the bottom side, respectively, of this substrate 12. Incidentally, specific film structure of the absorption type multi-layer films 13 and 16, constituent materials therefor, and layer thickness and refractive index of each layer are respectively shown in Table 2 below. Also, theoretical spectral transmission characteristics in the absorption type multi-layer films 13 and 16 of the absorption type multi-layer film ND filter according to the present invention, and their theoretical spectral reflection characteristics are shown in FIG. 7 and FIG. 8, respectively.

TABLE 2

| | Materials | Refractive index | Physical layer thickness (nm) |
|---|---|---|---|
| Medium: | Air | 1.00 | — |
| | Absorption type multi-layer film: (total layer thickness: 154 nm) | | |
| | $SiO_2$ | 1.46 | 70 |
| | Ni | 2.28 | 7 |
| | $SiO_2$ | 1.46 | 70 |
| | Ni | 2.28 | 7 |
| Substrate: | PC | 1.58 | — |
| | Absorption type multi-layer film: (total layer thickness: 154 nm) | | |
| | Ni | 2.28 | 7 |
| | $SiO_2$ | 1.46 | 70 |
| | Ni | 2.28 | 7 |
| | $SiO_2$ | 1.46 | 70 |
| Medium: | Air | 1.00 | — |

As shown in Table 2, the absorption type multi-layer films 13 and 16 are each constituted of metal film layers 15 and 18 formed of Ni alone and dielectric layers 14 and 17 formed of SiO$_2$ which are alternately respectively layered in the order from the substrate 12. Incidentally, these layers may be of any number. Shown in FIG. 6 are absorption type multi-layer films 13 and 16 in which the metal film layers 15 and 18 and the dielectric layers 14 and 17 are both in two layers, i.e., four layers in total. Also, in what is shown in Table 2, the metal film layers 15 and 18 and the dielectric layers 14 and 17 are each set to have the same layer thickness. Otherwise, each layer thickness may arbitrarily be adjusted on condition that the absorption type multi-layer films 13 and 16 are so formed as to have the film structure in which they are symmetrical to each other interposing the substrate between them.

Figure 11:
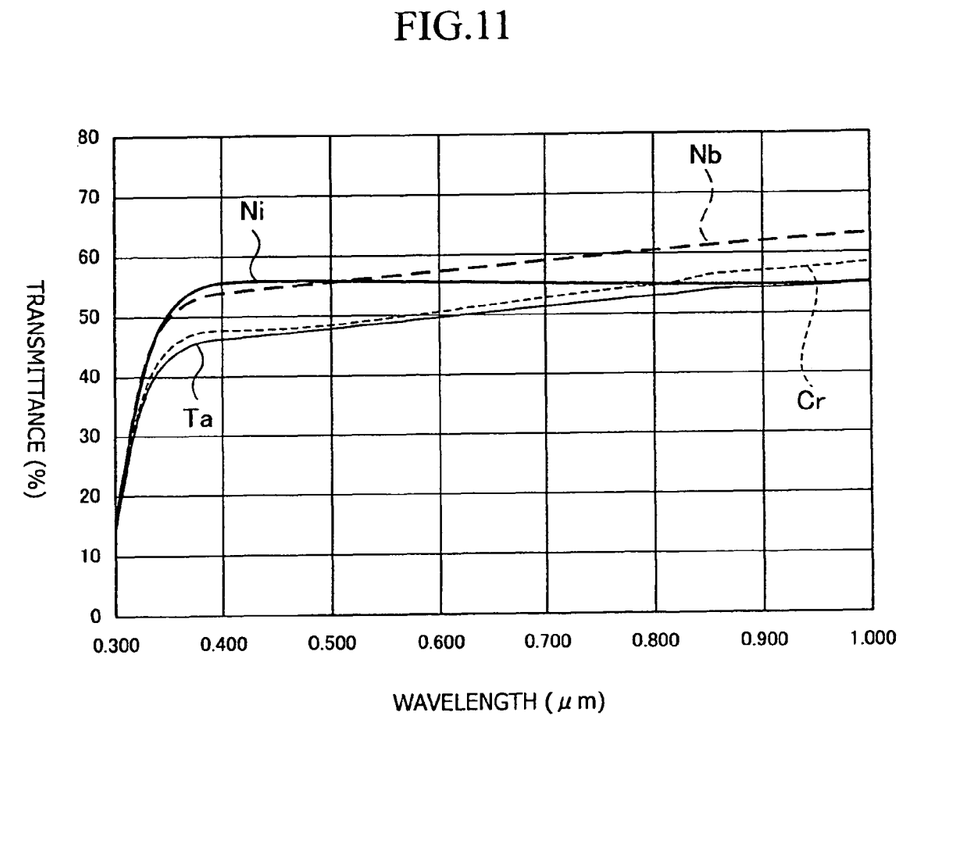
FIG. 11 is a graph showing the relationship between transmittance and wavelength in an Ni thin film, a Cr thin film, an Nb thin film and a Ta thin film.

Here, it has been confirmed that the wavelength dependence of transmittance in the Ni thin film constituting the metal film layers 15 and 18 is smaller than that in each of a Cr thin film, a Ta thin film and an Nb thin film. More specifically, the variation widths of transmittance in the Cr thin film, Ta thin film and Nb thin film at wavelengths of from 0.400 μm to 0.800 μm are 14.7%, 13.5% and 11.8%, respectively, as shown in the graph in FIG. 11, whereas the variation width of transmittance in the Ni thin film is as low as 1.5%.

However, the light reflecting from the surface of such an absorption type ND filter is stray light, which adversely affects image quality of digital cameras or the like. Hence, the absorption type multi-layer films 13 and 16 are constituted of the multi-layer films so that the surface of the absorption type ND filter can also be provided with the effect of preventing such reflection.

Thus, in the absorption type multi-layer film ND filters according to the present invention, the layer thickness of the metal film layers each formed of Ni alone or an Ni alloy is well controlled. Moreover, since the Ni type thin films formed of Ni alone or an Ni alloy have a small wavelength dependence of transmittance in the visible spectral range, the absorption type multi-layer films each constituted of metal film layers and dielectric layers enables, without superposing layers in a large number, achievement of a small wavelength dependence of spectral transmittance in the visible spectral range and the attenuation of transmittance that is flat for wavelengths.

Incidentally, the dielectric layers (here, those shown in Table 2) 14 and 17 are thin films each formed of SiO$_2$, and may preferably be constituted of a material (besides the SiO$_2$, Al$_2$O$_3$ or a mixture of SiO$_2$ and Al$_2$O$_3$) having a refractive index which is as low as possible with respect to the metal film layers 15 and 18 formed of Ni alone. Also, the layer thickness of the dielectric layers 14 and 17 may preferably be controlled in order to make the absorption type multi-layer films have the effect of preventing reflection.

The thickness of each of the metal film layers 15 and 18 formed of Ni alone and the dielectric layers 14 and 17 formed of SiO$_2$ is previously so set that the absorption type multi-layer films 13 and 16 can keep its stated transmittance and reflectance in the visible spectral range (e.g., approximately from 0.400 μm to 0.800 μm), and the metal film layers 15 and 18 may each particularly preferably have a thickness of from 2 nm to 15 nm. In the present absorption type multi-layer film ND filter, the absorption type multi-layer films 13 and 16 are formed incorporating the metal film layers 15 and 18 formed of Ni alone, and hence, even though it has as few as four layers in the number of layers, it has sufficiently flat transmittance characteristics.

Next, the absorption type multi-layer films according to the present invention may be formed by vacuum deposition, sputtering or ion plating.

For example, the sputtering is a thin-film forming method that is effective when films are formed on substrates by the use of materials having a low vapor pressure or when precise layer thickness control is required, and is widely used because of its very simple operability. In general, it is a method in which, under argon gas pressure of about 10 Pa or less, the substrate is set as the anode, and a target serving as a film raw material is set as the cathode, where glow discharge is made to take place to generate argon plasma, and also argon cations in the plasma are made to collide against the cathode target to sputter the particles of the target component so that the particles are deposited on the substrate to form films.

The sputtering is classified by how to generate the argon plasma. What makes use of high-frequency (RF) plasma is called high-frequency sputtering, and what makes use of direct-current plasma is called direct-current sputtering. Also, a process in which a magnet is disposed on the back of the target and the argon plasma is concentrated just above the target to improve collision efficiency of argon ions even at a low gas pressure to form films is called magnetron sputtering.

Then, the metal film layers in the absorption type multi-layer films according to the present invention may be formed by direct-current magnetron sputtering making use of an Ni type metal (Ni alone or an Ni alloy) target in an atmosphere of, e.g., Ar (argon) gas. Also, the dielectric layers may be formed by high-frequency magnetron sputtering making use of an Si or Al target in an atmosphere of, e.g., Ar gas and O$_2$ gas. Inasmuch as the dielectric layers are formed by such high-frequency magnetron sputtering, any abnormal discharge that may occur in reactive sputtering can be prevented to enable stable film formation.

Now, the pure Ni material is a ferromagnetic material. Hence, in the case when the metal film layers are formed by the direct-current magnetron sputtering, the magnetic force coming from the magnet disposed on the back of the target, which is to be made to act on the plasma generated between the target and the substrate, is obstructed by the Ni target material, and the magnetic field leaking to the surface may weaken to make it difficult to concentrate the plasma and form films in a good efficiency. In order to avoid this, films may preferably be formed by sputtering where a cathode (high-magnetic-field cathode) in which the magnetic field strength of the magnet disposed on the back of the target has been made stronger (over 400 Gauses) is used so that the magnetic field passing through the Ni target can be made stronger.

However, even where such a method is employed, another problem as stated below may come about at the time of production. That is, the thickness of the target decreases with continuous use of the Ni target, where, as stated previously, the leakage magnetic field in plasma space becomes stronger at the part where the target has become smaller in thickness. Then, as the leakage magnetic field in plasma space becomes stronger, discharge characteristics (such as discharge voltage and discharge current) may become different, so that the rate of film formation may change. That is, at the time of production, the continuous use of the same Ni target for a long time brings about the problem that the rate of film formation for the Ni film changes as the Ni target is consumed, to make it difficult to stably produce absorption type multi-layer film ND filters with uniform characteristics. To avoid this problem, as described previously the Ni alloy material formed by adding to Ni at least one element selected from Ti, Al, V, W, Ta and Si may be used to constitute the metal film layers.

In the present invention, it is preferable to use, e.g., an Ni alloy material containing the Ti element in an amount ranging from 5 to 15% by weight. The reason why the lower limit of the Ti content is set to 5% by weight is that the incorporation of Ti in an amount of 5% by weight or more enables the ferromagnetic properties to be extremely weakened, so that films can be formed by the direct-current magnetron sputtering even with use of a cathode provided with a usual magnet having a low magnetic force. Also, the ability to make the magnetic field obstructed by the target is so low that the change in leakage magnetic field in plasma space that depends on the consumption of the target can also be small and a constant rate of film formation can be maintained to enable stable film formation. Also, the reason why the upper limit of the Ti content is set to 15.0% by weight is that, if the Ti is incorporated in an amount of more than 15.0% by weight, there is a possibility that an intermetallic compound is formed in a large quantity to make the material no longer have small wavelength dependence of transmittance. The amount of any of the Al element, V element, W element, Ta element and Si element to be added may also be determined by the same reasons. Where any of these Al element, V element, W element, Ta element and Si element is/are added, it is preferable to make up an Ni alloy material formed by adding to Ni the Al element in a proportion of from 3 to 8% by weight, the V element in a proportion of from 3 to 9% by weight, the W element in a proportion of from 18 to 32% by weight, the Ta element in a proportion of from 5 to 12% by weight and/or the Si element in a proportion of from 2 to 6% by weight.

However, where two or more elements are added to the Ni, the amount of each element to be added may preferably be control to be lower than each upper-limit value so that the intermetallic compound may not be formed in a large quantity. For example, where Ti and Si two types of elements are to be added to Ni, if the Si element is added in an amount of more than 5% by weight with respect to the Ti element to be added in an amount of 7.5% by weight, the intermetallic compound may seriously be formed even though each numerical value of the amounts of these to be added is within the above compositional range (Ti element: from 5 to 15% by weight; Si element: from 2 to 6% by weight).

In addition to the elements such as Ti, Al, V, W, Ta and Si, Cu, Cr or the like is also available as an additive element which can weaken the ferromagnetic properties of Ni. However, if the Cu element is used as the additive element, it has a disadvantage that such an Ni—Cu film has an inferior adherence to the oxide film, compared with the above elements Ti, Al, V and so forth. For example, as disclosed in Japanese Patent Application Laid-open No. 2000-96167, which relates to a target material used in electrode materials, a field different from the ND filter, a target composed of an Ni—Ti alloy in place of an Ni—Cu alloy is proposed because there is a problem in the adherence to an oxide ceramic substrate. Thus, the Cu element is a material not suitable as the additive element in the present invention. Also, the Cr element has no problem on the adherence, but is not preferable because it may adversely affect the environment.

Incidentally, the metal film layers and the dielectric layers formed of $SiO_2$, $Al_2O_3$ or a mixture of these may also be formed on a filmlike substrate by dry-process roll-to-roll process coating.

The employment of the above structure on the absorption type multi-layer films makes it possible to provide an absorption type multi-layer film ND filter having a reflectance of 5% or less in the whole visible spectral range of from 0.400 μm to 0.800 μm and also having variation of transmittance in a width within 10%.

As is also ascertained from the values shown in Tables 1 and 2, the absorption type multi-layer film ND filter according to the present invention, compared with the ND filter according to the background art, can be as thin as about a half in each total layer thickness on the substrate both sides (i.e., in the ND filter according to the background art, its absorption type multi-layer films are each 270 nm thick and the multi-layer reflection preventive films are each 256 nm thick, whereas, in the absorption type multi-layer film ND filter according to the present invention, each absorption type multi-layer film on the substrate one side is 154 nm thick). Further, since only two types of film materials are used, the productivity can also be superior.

In the absorption type multi-layer film ND filter according to the present invention, in order to simplify film forming conditions to improve the productivity, film designing may also be so made that all the dielectric layers formed of $SiO_2$ as shown in Table 2 have the same thickness (70 nm) on both sides, and film designing may be so made that all the metal film layers formed of Ni alone also have the same thickness (7 nm) on both sides. Then, in order to form the absorption type multi-layer films on the substrate both sides, respectively, films may be formed for each side in the state the thin substrate is fastened to a frame so that it may not warp because of film stress. It, however, is ideal to form films simultaneously on both sides.

With such structure, it is achievable that the warpage of the substrate is controlled at a curvature of radius of 500 mm or more. If the warpage of the substrate is at a curvature of radius of less than 500 mm, this makes machinery handling difficult in the steps of working, as in cutting, bonding and welding the absorption type multi-layer film ND filters. It is further considered that images may come distorted because of their transmission through the absorption type multi-layer film ND filter. Thus, such curvature of radius is undesirable.

Then, when the absorption type multi-layer film ND filter according to the present invention, shown in FIG. 6 was placed on a platen (see reference numeral 4 in FIG. 1), the substrate did little warp, and the gap at the middle was as too small as 0.2 mm or less to be accurately measurable.

On the other hand, when the absorption type multi-layer film ND filter according to the background art, shown in FIG. 2 was placed on a platen (provided that the absorption type multi-layer film 6 of the absorption type multi-layer film ND filter was on the top side, and the multi-layer reflection preventive film 7 on the bottom side), the substrate warped and a gap of about 2 mm was seen at the middle.

When the substrate has a size of 60 mm in diameter, a gap of about 0.9 mm produced at the middle makes the warpage have a curvature of radius of 500 mm.

Incidentally, as to the layer thickness of the dielectric layers and metal film layers of the absorption type multi-layer film ND filter according to the present invention, it is preferable that the total layer thickness of the dielectric layers on the substrate one side which are each formed of $SiO_2$, $Al_2O_3$ or a mixture of these is set at 100 nm or more, and the total layer thickness of the metal film layers on the substrate one side which are each formed of Ni alone or an Ni alloy, at 30 nm or less. This is because, if the total layer thickness of the dielectric layers on the substrate one side is set at less than 100 nm, it may be difficult to provide the absorption type multi-layer films with the reflection preventive function, and, if the total layer thickness of the metal film layers on the substrate one side is set thick at more than 30 nm, an extremely low spectral transmittance may result though it is expected that the film stress is relaxed by making the metal film layers thick, which are softer than the dielectric layers.

Here, in the absorption type multi-layer film ND filter according to the present invention, where the absorption type multi-layer films having the film structure in which they are symmetrical to each other interposing the substrate between them are formed, it is not always required to fulfill a perfectly symmetrical condition. It is enough to fulfill a condition which is substantially symmetrical to an extent that the film stresses can be cancelled to one another. For example, if the transmittance of the absorption type multi-layer film is found higher than the estimated value as a result of evaluation of optical characteristics which is made after the absorption type multi-layer film has been formed on the surface side of the substrate, the transmittance of the absorption type multi-layer film on the back side may be made lower. If on the other hand the transmittance of the absorption type multi-layer film on the surface side of the substrate is found lower than the estimated value, the transmittance of the absorption type multi-layer film on the back side may be made higher. Such microadjustment may be made on the film structure of the absorption type multi-layer film on the back side of the substrate to correct the transmittance.

An adherent layer comprising Si, $SiO_x$ (where x is 2 or less), $SiN_x$ (where x is 1 or less), TiO, $TiO_x$ (where x is 2 or less) or $TiN_x$ (where x is 1 or less) may be provided between the substrate and each absorption type multi-layer film so as to improve adherence between the substrate and the absorption type multi-layer films.

The present invention is described below in greater detail by giving Examples. In Examples, absorption type multi-layer film ND filters according to Examples 1, 3 and 4 are compared with an absorption type multi-layer film ND filter according to Comparative Example to make evaluation.

Example 1

As a substrate, a PC (polycarbonate) film of 100 μm thick which was cut to have a diameter of 60 mm was used. This film was fastened with a metallic frame with which the film was holdable at its portion of about 5 mm from the peripheral edge, and films were formed for each side. To form the films, an RF magnetron sputtering apparatus (manufactured by ULVAC Corporation) was used to form $SiO_2$ dielectric layers at a film formation rate of 0.2 nm/second and Ni metal film layers at a film formation rate of 0.1 nm/second using an Ni target. Also, this absorption type multi-layer film ND filter had the same film structure on both sides, and hence the films were formed through the same steps for each one side.

The absorption type multi-layer films thus formed on the film both sides, respectively, had the same film structure as that of the absorption type multi-layer film ND filter shown in FIG. 6, where the $SiO_2$ dielectric layers were each 70 nm in layer thickness and the Ni metal film layers were each 7 nm in layer thickness.

Then, when this absorption type multi-layer film ND filter according to Example 1 was placed on a platen, the film as the substrate little warped, and the gap at the middle was as too small as 0.2 mm or less to be accurately measurable.

Example 2

The procedure of Example 1 was repeated except that, in place of the Ni target used in Example 1, an Ni alloy target containing 7.5% by weight of Ti was used (a target available from Sumitomo Metal Mining Co., Ltd.). Thus, an absorption type multi-layer film ND filter according to Example 2 was produced which had the same film structure as that of the absorption type multi-layer film ND filter shown in FIG. 6 and in which the $SiO_2$ dielectric layers were each 70 nm in layer thickness and the Ni alloy metal film layers were each 7 nm in layer thickness.

Then, when this absorption type multi-layer film ND filter according to Example 2 was placed on a platen, the film as the substrate little warped also in this absorption type multi-layer film ND filter, and the gap at the middle was as too small as 0.2 mm or less to be accurately measurable.

Example 3

The procedure of Example 1 was repeated except that, in place of the Ni target used in Example 1, the Ni alloy target containing 7.5% by weight of Ti was used (a target available from Sumitomo Metal Mining Co., Ltd.) and, in place of the $SiO_2$ of the dielectric layers, $Al_2O_3$ was used as shown in Table 3 below. Thus, an absorption type multi-layer film ND filter according to Example 3 was produced which had the same film structure as that of the absorption type multi-layer film ND filter shown in FIG. 6 and in which the $Al_2O_3$ dielectric layers were each 60 nm in layer thickness and the Ni alloy (Ni—Ti) metal film layers were each 7.7 nm in layer thickness.

TABLE 3

| | Materials | Refractive index | Physical layer thickness (nm) |
|---|---|---|---|
| Medium: | Air | 1.00 | — |
| | Absorption type multi-layer film: (total layer thickness: 135 nm) | | |
| | $Al_2O_3$ | 1.67 | 60 |
| | Ni—Ti | 2.28 | 7.7 |
| | $Al_2O_3$ | 1.67 | 60 |
| | Ni—Ti | 2.28 | 7.7 |
| Substrate: | PC | 1.58 | — |
| | Absorption type multi-layer film: (total layer thickness: 135 nm) | | |
| | Ni—Ti | 2.28 | 7.7 |
| | $Al_2O_3$ | 1.67 | 60 |
| | Ni—Ti | 2.28 | 7.7 |
| | $Al_2O_3$ | 1.67 | 60 |
| Medium: | Air | 1.00 | — |

More specifically, as a substrate, a PC (polycarbonate) film of 100 μm thick which was cut to have a diameter of 60 mm was used. This film was fastened with a metallic frame with which the film was holdable at its portion of about 5 mm from the peripheral edge, and films were formed for each side. Incidentally, to form the films, an RF magnetron sputtering apparatus (manufactured by ULVAC Corporation) was used to form the $Al_2O_3$ dielectric layers at a film formation rate of 0.2 nm/second and the metal film layers at a film formation rate of 0.1 nm/second using the Ni alloy target (available from Sumitomo Metal Mining Co., Ltd.). Also, this absorption type multi-layer film ND filter had the same film structure on both sides, and hence the films were formed through the same steps for each one side.

Figure 12:
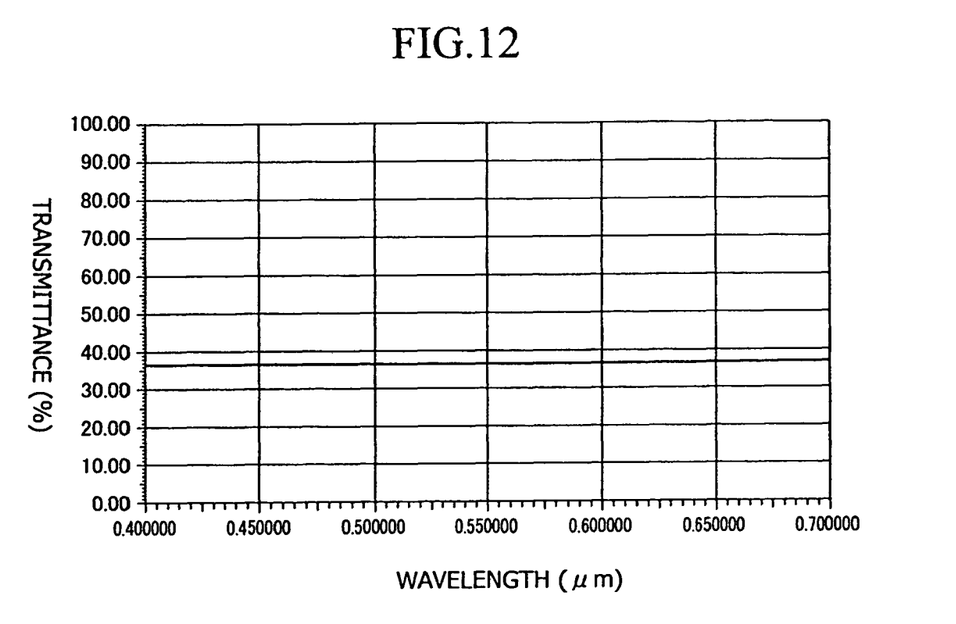
FIG. 12 is a graph showing theoretical spectral transmission characteristics in an absorption type multi-layer film of an absorption type multi-layer film ND filter according to the present invention, shown in Table 3.
Figure 13:
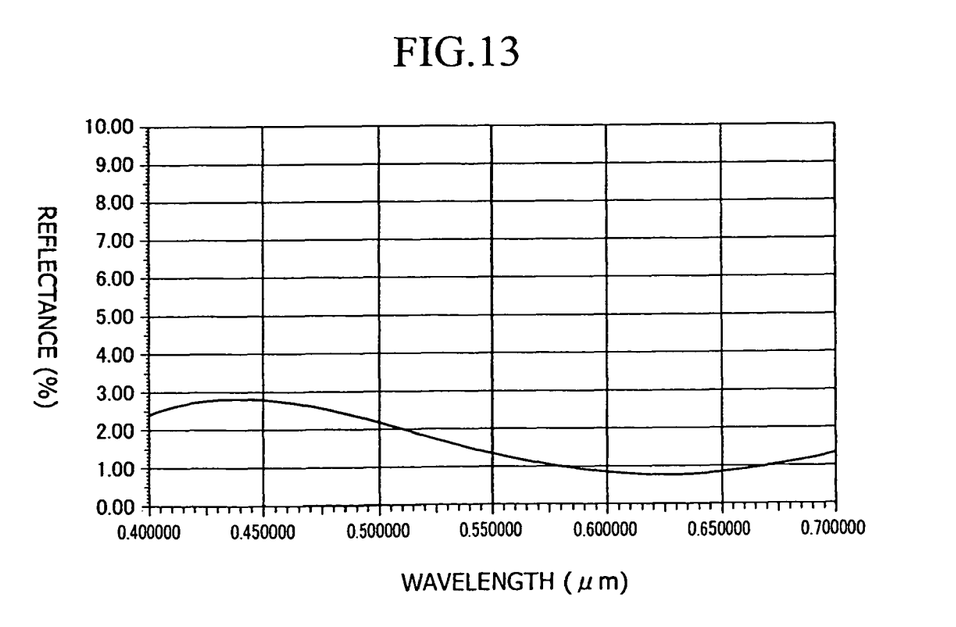
FIG. 13 is a graph showing theoretical spectral reflection characteristics in the absorption type multi-layer film of the absorption type multi-layer film ND filter according to the present invention, shown in Table 3.
Figure 14:
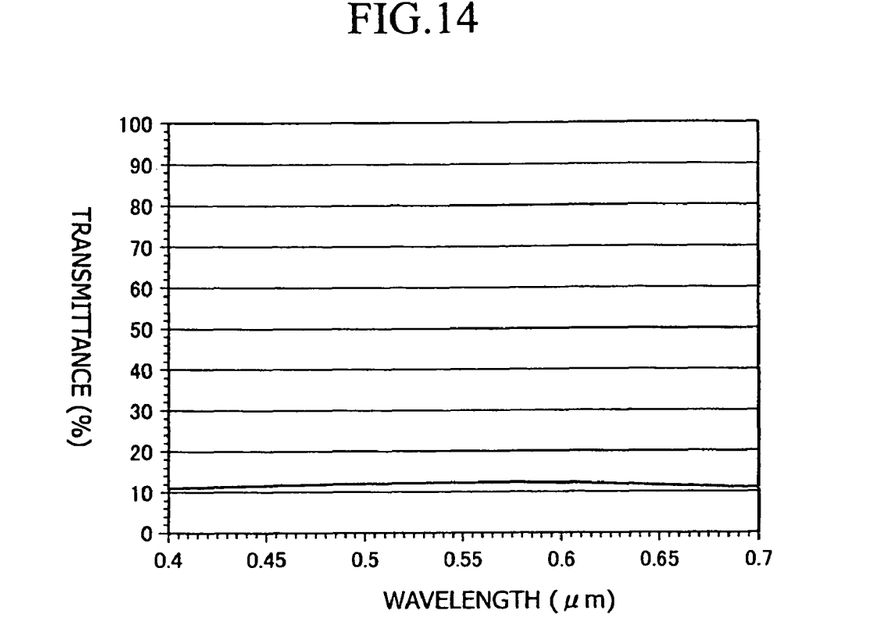
FIG. 14 is a graph showing spectral transmission characteristics of an absorption type multi-layer film ND filter according to Example 3.

Theoretical spectral transmittance calculated when the absorption type multi-layer film was formed on one side are shown in FIG. 12, and theoretical spectral reflectance in FIG. 13. Also, spectral transmittance of the absorption type multi-layer film ND filter according to Example 3 actually produced by film formation is shown in FIG. 14.

Then, when this absorption type multi-layer film ND filter according to Example 3 was placed on a platen, the film as the substrate little warped and the gap at the middle was as too small as 0.2 mm or less to be accurately measurable.

Example 4

The procedure of Example 1 was repeated except that, in place of the Ni target used in Example 1, the Ni alloy target containing 7.5% by weight of Ti was used (a target available from Sumitomo Metal Mining Co., Ltd.) and, in place of the $SiO_2$ of the dielectric layers, a mixture of $SiO_2$ and $Al_2O_3$ (molar ratio: 1:1) was used as shown in Table 4 below. Thus, an absorption type multi-layer film ND filter according to Example 4 was produced which had the same film structure as that of the absorption type multi-layer film ND filter shown in FIG. 6 and in which the $SiO_2$—$Al_2O_3$ mixture dielectric layers were each 67 nm in layer thickness and the Ni alloy (Ni—Ti) metal film layers were each 7.3 nm in layer thickness.

TABLE 4

| | Materials | Refractive index | Physical layer thickness (nm) |
|---|---|---|---|
| Medium: | Air | 1.00 | — |
| | Absorption type multi-layer film: (total layer thickness: 149 nm) | | |
| | $SiO_2 + Al_2O_3$ | 1.56 | 67 |
| | Ni—Ti | 2.28 | 7.3 |
| | $SiO_2 + Al_2O_3$ | 1.56 | 67 |
| | Ni—Ti | 2.28 | 7.3 |
| Substrate: | PC | 1.58 | — |
| | Absorption type multi-layer film: (total layer thickness: 149 nm) | | |
| | Ni—Ti | 2.28 | 7.3 |
| | $SiO_2 + Al_2O_3$ | 1.56 | 67 |
| | Ni—Ti | 2.28 | 7.3 |
| | $SiO_2 + Al_2O_3$ | 1.56 | 67 |
| Medium: | Air | 1.00 | — |

More specifically, as a substrate, a PC (polycarbonate) film of 100 μm thick which was cut to have a diameter of 60 mm was used. This film was fastened with a metallic frame with which the film was holdable at its portion of about 5 mm from the peripheral edge, and films were formed for each side. Incidentally, to form the films, an RF magnetron sputtering apparatus (manufactured by ULVAC Corporation) was used to form the $SiO_2$—$Al_2O_3$ mixture dielectric layers at a film formation rate of 0.2 nm/second and the metal film layers at a film formation rate of 0.1 nm/second using the Ni alloy target (available from Sumitomo Metal Mining Co., Ltd.). Also, this absorption type multi-layer film ND filter had the same film structure on both sides, and hence the films were formed through the same steps for each one side.

Figure 15:
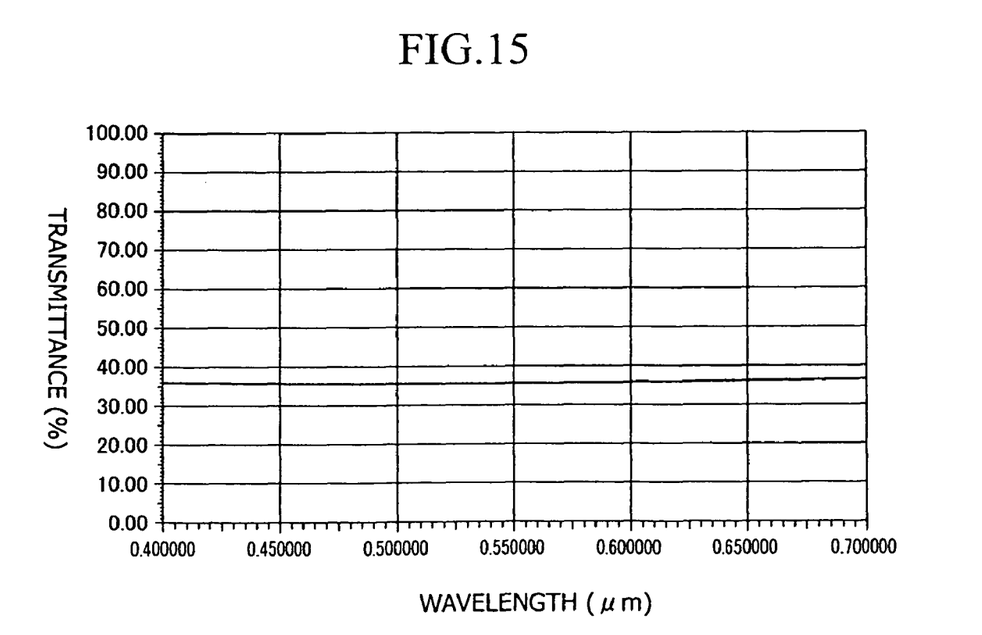
FIG. 15 is a graph showing theoretical spectral transmission characteristics in an absorption type multi-layer film of an absorption type multi-layer film ND filter according to the present invention, shown in Table 4.
Figure 16:
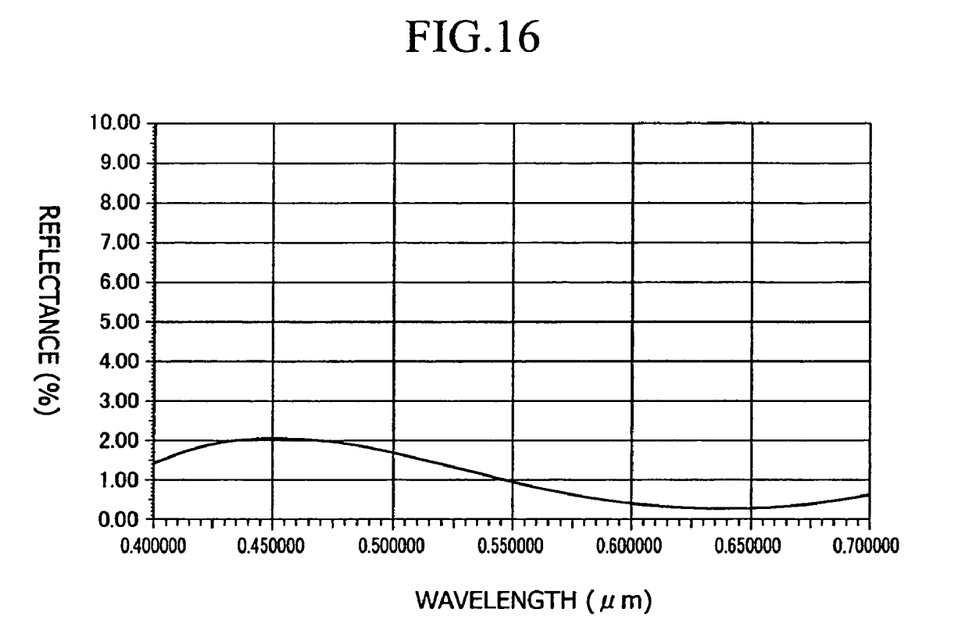
FIG. 16 is a graph showing theoretical spectral reflection characteristics in the absorption type multi-layer film of the absorption type multi-layer film ND filter according to the present invention, shown in Table 4.
Figure 17:
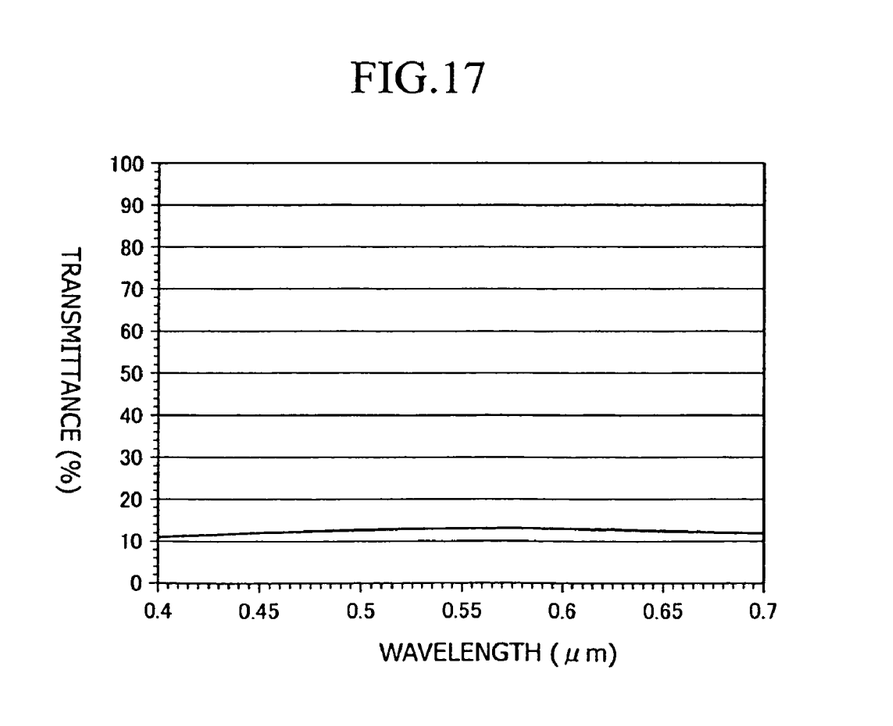
FIG. 17 is a graph showing spectral transmission characteristics of an absorption type multi-layer film ND filter according to Example 4.

Theoretical spectral transmittance calculated when the absorption type multi-layer film was formed on one side are shown in FIG. 15, and theoretical spectral reflectance in FIG. 16. Also, spectral transmittance of the absorption type multi-layer film ND filter according to Example 4 actually produced by film formation is shown in FIG. 17.

Then, when this absorption type multi-layer film ND filter according to Example 4 was placed on a platen, the film as the substrate little warped and the gap at the middle was as too small as 0.2 mm or less to be accurately measurable.

Comparative Example

Absorption type multi-layer films were first formed on the PC film, and thereafter multi-layer reflection preventive films were formed to obtain an absorption type multi-layer film ND filter according to Comparative Example.

To form the films, an RF magnetron sputtering apparatus (manufactured by ULVAC Corporation) was used to form $SiO_2$ dielectric layers and Ni metal film layers of the absorption type multi-layer film at a film formation rate of 0.2 nm/second and at a film formation rate of 0.1 nm/second, respectively, and also to form $SiO_2$ dielectric layers and $Ta_2O_5$ metal film layers of the multi-layer reflection preventive film at a film formation rate of 0.2 nm/second and at a film formation rate of 0.2 nm/second, respectively.

The absorption type multi-layer film formed on one side of the PC film had the same film structure as that of the absorption type multi-layer film ND filter shown in FIG. 2, where the $SiO_2$ dielectric layers were each 80 nm in layer thickness and the Ni metal film layers were each 10 nm in layer thickness. The multi-layer reflection preventive film also formed on the other side of the PC film also had the same film structure as that of the absorption type multi-layer film ND filter shown in FIG. 2, where their layer thicknesses were as shown in Table 1 above.

Then, when the absorption type multi-layer film ND filter according to Comparative Example was placed on a platen (provided that the absorption type multi-layer film of the absorption type multi-layer film ND filter was on the top side, and the multi-layer reflection preventive film on the bottom side), the PC film as the substrate warped and a gap of about 2 mm was seen at the middle.

When the substrate has a size of 60 mm in diameter, a gap of about 0.9 mm produced at the middle makes the warpage have a curvature of radius of 500 mm. Thus, the above results showed that the curvature of radius was much smaller than it.

Evaluation:

Next, the spectral transmission characteristics of the absorption type multi-layer film ND filters according to Examples 1, 3 and 4 each and that of the absorption type multi-layer film ND filter according to Comparative Example were evaluated. The spectral transmission characteristics were measured with an autographic spectrophotometer U4100, manufactured by Hitachi Ltd.

Figure 9:
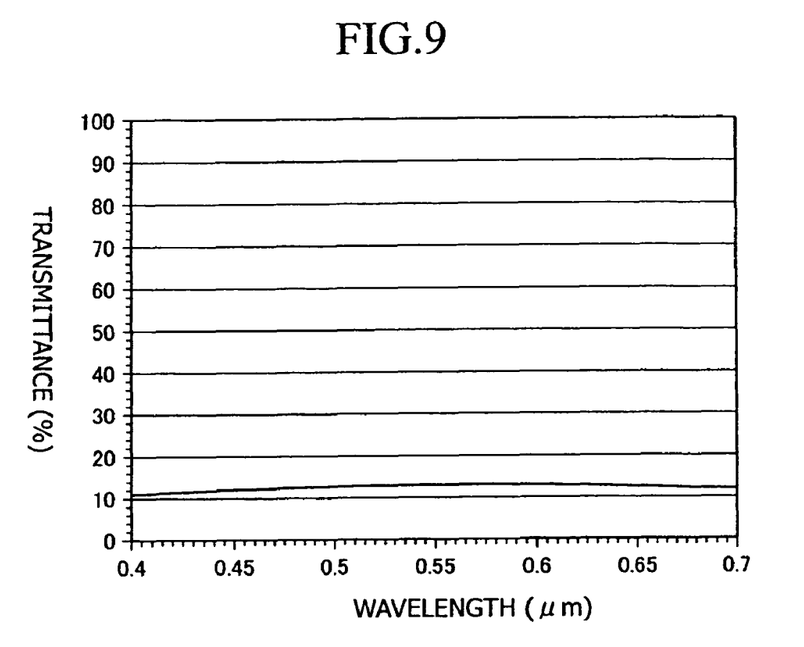
FIG. 9 is a graph showing spectral transmission characteristics of an absorption type multi-layer film ND filter according to Example 1.
Figure 10:
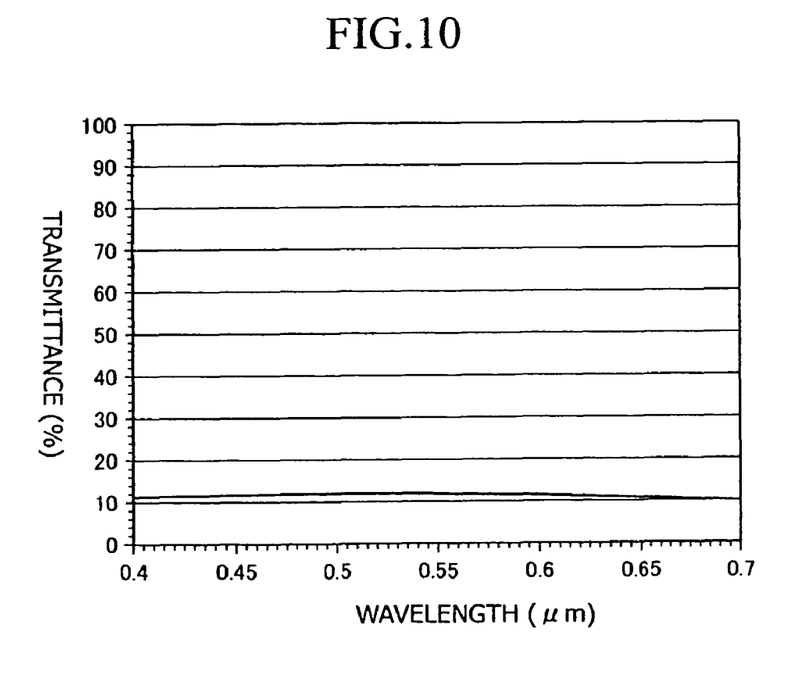
FIG. 10 is a graph showing spectral transmission characteristics of an absorption type multi-layer film ND filter according to Comparative Example.

The spectral transmission characteristics of the absorption type multi-layer film ND filters according to Examples 1, 3 and 4 each is shown in FIGS. 9, 14 and 17, respectively, and the spectral transmission characteristics of the absorption type multi-layer film ND filter according to Comparative Example, in FIG. 10.

As the results, all the absorption type multi-layer film ND filters according to Examples 1, 3 and 4 and the absorption type multi-layer film ND filter according to Comparative Example were found to have substantially the same transmission characteristics in the service wavelength range of from 0.4 to 0.7 μm.

Thus, the absorption type multi-layer film ND filter according to each Example has the same optical characteristics as the absorption type multi-layer film ND filter according to the background art (Comparative Example), and also ND filters can be obtained which are free from warpage of their substrates. Moreover, the ND filters have the same film structure on both sides of their substrates and, in addition thereto, all the dielectric layers on the both sides are made up to have the same layer thickness, and all the metal film layers, to have the same layer thickness, and hence this also promises superior productivity.

What is claimed is:

1. An absorption type multi-layer film ND filter which consists of:
   a substrate consisting of: (a) a resin film, a resin sheet or a thin glass sheet, and (b) first and second absorption type multi-layer films which attenuate transmitted light and which are disposed on opposing faces of the substrate, wherein;

said first and second absorption type multi-layer films consist of dielectric layers and metal film layers, the dielectric layers consisting of $SiO_2$, $Al_2O_3$ or a mixture of these, and the metal film layers consisting of a Ni alloy formed by adding Ti to Ni;

the layers are alternately layered on the substrate;

the first and second absorption type multi-layer films are mirror-image symmetrical to each other across a center plane of the substrate between them; and warpage of the substrate is at a curvature of radius of 500 mm or more.

2. The absorption type multi-layer film ND filter according to claim 1, wherein said dielectric layers on the substrate one side which consist of $SiO_2$, $Al_2O_3$ or a mixture of these have a total layer thickness of 100 nm or more and said metal film layers on the substrate one side which consist of a Ni alloy have a total layer thickness of 30 nm or less.

3. The absorption type multi-layer film ND filter according to claim 2, wherein said dielectric layers that consist of $SiO_2$, $Al_2O_3$ or a mixture of these all have the same layer thickness and said metal film layers that consist of a Ni alloy all have the same layer thickness.

4. The absorption type multi-layer film ND filter according to claim 2, wherein said absorption type multi-layer film is formed by a film forming process selected from vacuum deposition, sputtering and ion plating.

5. The absorption type multi-layer film ND filter according to claim 1, wherein the Ti element has been added in a proportion of from 5 to 15% by weight.

6. The absorption type multi-layer film ND filter according to claim 1, wherein said absorption type multi-layer film is formed by a film forming process selected from vacuum deposition, sputtering and ion plating.

7. The absorption type multi-layer film ND filter according to claim 1, wherein said dielectric layers that consist of $SiO_2$, $Al_2O_3$ or a mixture of these all have the same layer thickness and said metal film layers that consist of a Ni alloy all have the same layer thickness.

* * * * *